Oct. 26, 1965  J. J. ZYLSTRA  3,213,499
HOSE CLAMP
Filed Nov. 14, 1963
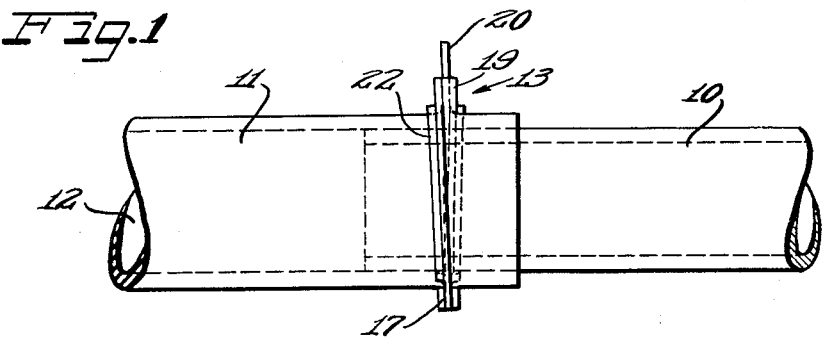
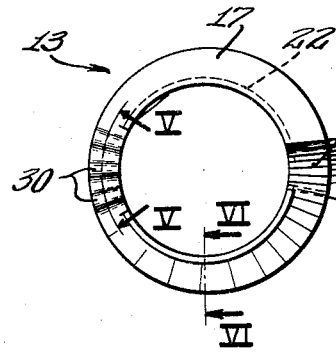
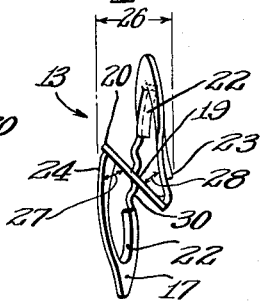
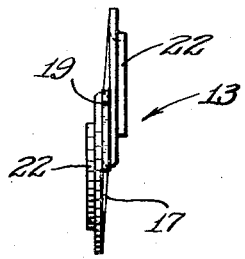
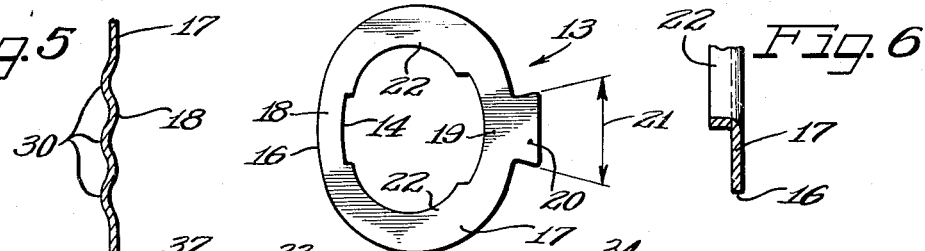
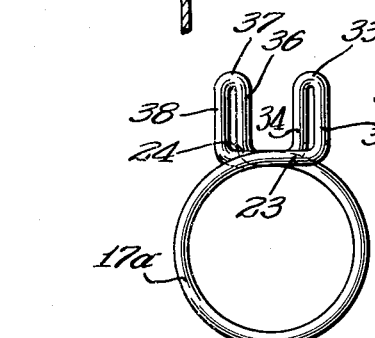
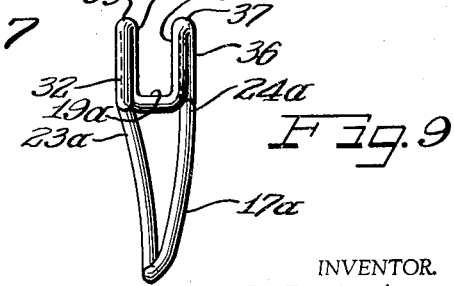
INVENTOR.
John J. Zylstra
BY
Hill, Sherman, Meroni, Gross & Simpson
ATTORNEYS United States Patent Office 3,213,499
Patented Oct. 26, 1965

3,213,499
HOSE CLAMP
John J. Zylstra, Benton Harbor, Mich., assignor to Whirlpool Corporation, St. Joseph, Mich., a corporation of Delaware
Filed Nov. 14, 1963, Ser. No. 323,854
7 Claims. (Cl. 24—20)

This invention relates generally to fastening devices and more particularly relates to a clamp, one environment of particular utility constituting an organization wherein the clamp is used for extending around a hose and clamping the hose on a conduit.

In most prior art type clamping devices, a special setting tool is required to actuate the fastening device into a proper clamping relationship with the inner and outer concentrically disposed members which are adapted to be fastened together. If the operator attempts to use a common pair of pliers with such prior art devices, the result is that the pliers either slips off, thereby frustrating the operator, or else the actuating portions of the clamping device are so damaged as to preclude the effective utilization of the device for the purpose intended.

In accordance with the principles of the present invention, a one-piece circumferentially continuous clamping device is provided wherein an integral actuating portion can be simply and conveniently adjusted with an ordinary working tool such as a pliers, thereby to exploit an unusually high mechanical advantage in operating the device in the manner of a free hinge and obtaining improved clamping effort by reducing the effective inner diameter prescribed by the clamping member.

It is an object of the present invention, therefore, to provide an improved clamping device which overcomes the difficiencies of the prior art.

Yet another object of the present invention is to provide a clamp which is made as an integral one-piece member and which can be simply and conveniently operated with ordinary working tools such as a pliers.

A still further object of the present invention is to provide a clamping device which can be effectively fabricated either as a stamping when made from ordinary sheet metal, or which can be fabricated from a length of metal wire.

A still further object of the present invention is to provide a hose clamp adapted to extend around a hose and clamp the hose on a conduit wherein the clamping effort can be exerted and maintained with a very high mechanical advantage.

A still further object of the present invention is to provide an inexpensive hose clamp that can easily be released from its clamping position without the use of special tools.

Yet another object of the present invention is to provide a clamping device which is extremely efficient for its intended purpose and which has an enlarged bearing area in order to protect the hose with which it is associated.

Many other features, advantages and additional objects of the present invention will become manifest to those versed in the art upon making reference to the detailed description which follows and the accompanying sheet of drawings in which preferred structural embodiments incorporating the principles of the present invention are shown by way of illustrative example.

On the drawings:
FIGURE 1 is a side elevational view of a clamp extending around a hose and clamping the hose onto a conduit, the clamp shown therein embodying the principles of the present invention;
FIGURE 2 is an end elevational view of the clamp shown in FIGURE 1;
FIGURE 3 is a side elevational view of the clamp shown in FIGURE 2 with the clamp in an initial position of adjustment to prescribe an opening of initial size;
FIGURE 4 is a view similar to FIGURE 3 but showing the clamp in a second position of adjustment or in the prescribed opening is reduced in size so that the device will exert a clamping action;
FIGURE 5 is a fragmentary cross-sectional view taken generally on line V—V of FIGURE 2;
FIGURE 6 is a fragmentary cross-sectional view taken on line VI—VI of FIGURE 2;
FIGURE 7 is an elevational view of the clamp in developed form;
FIGURE 8 is an elevational view of an alternative form of the present invention utilizing a wire form material; and
FIGURE 9 is a side elevational view of the device of FIGURE 8.

As shown on the drawings:
The present invention finds utility wherever inner and outer concentrically disposed members are required to be clamped together by a clamping force requiring a radially applied circumferentially distributed restricting force. Accordingly, although the clamping device of the present invention finds a particular utility to the conduit system of laundry machines and similar appliances embodying hydraulic circuitry, it will be appreciated that the clamp can be used effectively in any other organization wherever inner and outer members are required to be clamped together.

In the exemplary organization illustrated in FIGURE 1, a conduit is shown at 10 having an outer diameter sized to be embraced by a flexible hose 11 having a bore 12 of a diameter sized to snugly embrace the outer diameter of the conduit 10. A clamping device shown generally at 13 embraces the outer diameter of the hose 11 and is situated intermediate the overlapping portions of the conduit 10 and the hose 11, thereby to apply a radially inwardly directed circumferentially distributed clamping force for maintaining the hose 11 in firm sealed-together assembly with the conduit 10.

In the embodiment of FIGURES 1-6, the clamping device 13 constitutes, in developed form, a circumferentially extending continuous loop which may be formed from cold rolled sheet metal stock or other similar non-ductile material, for example, by means of a stamping operation.

Thus, the flat sheet metal article is depicted in developed form in FIGURE 7 and it will be noted that there is provided a circumferentially continuous loop having an inner periphery 14 and an outer periphery 16, the inner and outer peripheries 14 and 16 being relatively offset in eccentric relation to provide a generally annular ring-shaped member 17 having a minimum width area 18 on one side of the loop and a maximum width area 19 diametrically opposite thereto. Furthermore, the outside peripheral edge 16 is characterized by a radially outwardly extending lug portion 20 formed at the maximum width area 19 and extending through an arcuate area measured at 21.

The inner peripheral edge 14 is also characterized by two radially inwardly extending portions 22 which are offset to extend axially and form flanges as shown in detail in FIGURE 6, thereby providing an enlarged smooth bearing area for seating and engaging against the peripheral surface of an adjoining hose such as the hose 11, thereby protecting the surface of the hose against abrasion and cutting. Although only one form of enlarged bearing surface is shown in FIGURE 6, many other cross section shapes may be employed such as T or inverted U shaped sections to obtain an enlarged smooth bearing surface.

The clamping device 13 is preformed generally to the configuration depicted in FIGURES 2 and 3. Therein it will be noted that the loop member 17 forms a circumferentially continuous loop which extends through more than 360° of arc. The loop member 17, as shown in FIGURES 2 and 3 presents a closed loop with end portions 23 and 24 which overlap circumferentially and which are offset in a direction parallel to the axis of the closed loop, the dimensional extent of such offset being indicated in FIGURE 3 as noted at 26.

The extreme end portion 24 is reversely bent as is the extreme end portion of the loop shown at 23 and such end portions 23 and 24 are integrally joined together by a common rigid link formed by the lug portion 20 and the portions of the loop radially contiguous thereto provided by the maximum width area 19 which extends crosswise therebetween. Thus, in FIGURE 3, the rigid link is identified by the same reference numeral 19 as was used to identify the maximum width area in FIGURE 7 and it will be noted that the rigid link 19 forms an acute angle 27 with the end portion 24 and an acute angle 28 with the end 23. Although the acute angles 27 and 28 may take the value of any acute angle, the clamp has been found to be most effective when angles 27 and 28 are formed at 45 degrees.

When so disposed, the clamping device 13 prescribes a generally circular opening, as shown in FIGURE 2, of an initial size.

It is further contemplated by the present invention that the loop member 17 will have the minimum width area 18 corrugated with one or more radially extending corrugations 30. One of the functions of the corrugations 30 is to provide the clamping device with adaptability in accommodating various hose sizes. Thus, it is possible to put in as many corrugations as necessary and vary the depth of the corrugations to adjust the clamping device to a desired hose size.

When a specific clamping device 13 is selected for the association therewith of an organizational environment including a conduit 10 and a hose 11, the clamping device 13 is positioned as shown in FIGURE 1, whereupon a common clamping tool such as a pair of pliers is used to exert a clamping force on ends 23 and 24 thereby urging ends 23 and 24 towards each other thus moving rigid link 19 substantially into the plane of the loop 17. In other words, in its initial status, the rigid link 19 is disposed obliquely to the plane of the loop body, but the ends 23 and 24 of the loop together with the rigid link 19 are adjustably movable towards a coplanar relationship. Such movement of the link 19 and the corresponding end portions 23 and 24 is depicted in FIGURE 4 wherein it will be noted that the angles 27 and 28 are reduced to zero and the obliquely disposed crosswise extending rigid link 19 is toward coplanar relationship with the loop 17.

When such movement occurs, the circular conformation of the loop 17 is actually decreased so that the loop exerts a clamping action.

When angles 27 and 28 are reduced to zero and rigid link 19 is in near coplanar relationship with the loop 17, a continuous, rigid loop is effectively formed thereby giving a positive clamping action.

In this connection, the corrugations 30 develop an added safety function. If the loop member is overstressed during the tightening or clamping operation, the corrugations 30 will tend to stretch out, thereby dissipating the forces tending to produce such overstressing and preventing a malfunction of the clamping device.

Accordingly, in clamping applications where very high pressures are to be retained within the clamped hose 11 the corrugations 30 may be eliminated in order to obtain a more rigid clamp that would withstand the higher forces without yielding.

It will be evident that the clamping device operates in the manner of a free hinge and unusually high mechanical advantages are obtainable. Thus, in the last degree of arcuate adjustment of the rigid link 19, the mechanical advantage operable on the ends 23 and 24 of the loop amounts to approximately 28 or 29 to 1. That mechanical advantage increases progressively so that in the last two minutes of arcuate movement, the mechanical advantage is approximately between 800 and 900 to 1. Accordingly, it will be appreciated that a particularly effective clamping action can be applied through the utilization of the device herein described.

To release the clamp from the clamping position as shown in FIGURE 4, the lug portion 20 is conveniently grasped by a common tool such as a pair of pliers and rotated in a counterclockwise direction forcing ends 23 and 24 to separate until the initial unclamped position as shown in FIGURE 3 is reached. The clamp may then be used for a subsequent clamping operation.

If it is desired to provide the clamping device in the form of a length of wire rather than in a sheet metal form, as described in connection with the embodiment of FIGURES 1–7, a device similar to that illustrated in FIGURES 8 and 9 can be provided. Thus, a length of metal wire is shown bent in the form of a continuous circumferentially extending loop 17a. The loop extends through more than 360° of arc and has overlapping ends 23a and 24a integrally connected by rigid link 19a. The link 19a is particularly characterized by radially outwardly extending portions formed by offsetting the end 23a in radially outwardly extending direction as at 32, the leg 32 being reversely bent at 33 to provide a parallel leg 34. In like manner the end 24 is offset at right angles to provide a radially outwardly extending leg 36 and is then reversely bent as at 37 to provide a parallel leg 38.

In operation, the wire form embodiment of the invention will afford all of the advantages of the sheet metal form of the invention already described in that manipulation of the rigid link 19 in moving the ends 23a and 24a towards coplanar relation will exert great mechanical advantage and will decrease the size of the loop 17a to exert a highly efficient clamping action.

In both forms of the invention, it will be appreciated that the device is characterized by a circumferentially continuous ring which has formed therein at least one Z-shaped section provided by the contiguous relationship of the ends 23 and 24 or 23a and 24a joined by the crosswise extending rigid link 19 or 19a. Further, the Z-shaped section thus provided in closable to reduce the effective diameter of the device for exerting a clamping action. Although the invention is illustrated herein as having only a single Z-shaped section, it is conceivable that plural Z-shaped sections could be provided to increase the total amount of available adjustment.

Although minor modifications might be suggested by those versed in the art, it should be understood that I wish to embody within the scope of the patent warranted hereon all such modifications as reasonably and properly come within the scope of my contribution to the art.

The embodiments of the invention in which an exclusive property or privilege is claimed are defined as follows:

1. A fastener comprising,
   a ring-shaped member forming a closed loop extending circumferentially through more than 360° of arc and having circumferentially overlapping end portions of the same radius of curvature as said loop and offset in an axial direction with respect to the axis of the loop and disposed in axial spaced relationship to each other,
   means interconnecting said end portions including an integral rigid link positioned intermediate and adjacent to said end portions in the same axial direction and extending obliquely across the space between said end portions,
   said end portions and said link being movable toward a common plane to close said space and decrease the diameter of the ring-shaped member for exerting a clamping action.

2. A fastener comprising
a ring-shaped member forming a closed loop extending circumferentially through more than 360° of arc and having ends which overlap circumferentially in a direction parallel to the axis of the loop and which are offset in the same direction but joined by means including an integral rigid linear link disposed adjacent said ends in said same direction,
   said ends and said link joined together and being movable towards a common plane to decrease the diameter of the ring-shaped member for exerting a clamping action.

3. A fastener as defined in claim 1 and being further characterized by said ring-shaped member having an inner peripheral edge offset axially to form a flange providing an enlarged bearing area.

4. A fastener as defined in claim 3 and being further characterized by said ring-shaped member having radially extending corrugations formed therein,
   whereby overstressing said ring-shaped member towards closed position will stretch said corrugations.

5. A fastener as defined in claim 1 and further characterized by said link having portions extending radially outwardly of said ring-shaped member into an accessible position to facilitate adjustment of said end portions.

6. A fastener comprising
a sheet metal member forming a circumferentially continuous loop extending through more than 360° of arc and having
   inner and outer peripheral edges eccentrically offset to form said loop into an annular configuration having
      a minimum width at one area of the loop and a maximum width at a second area of the loop diametrically opposite said one area,
   said member being further characterized by a lug portion extending radially outwardly of said outer peripheral edge and extending through approximately that arcuate distance in excess of 360° of arc,
   said lug portion and that portion of said loop radially inwardly adjacent thereof being offset angularly to form acute angles with the circumferentially adjacent portions of the loop,
thereby disposing said circumferentially adjacent portions in different parallel plane and forming a generally circular opening,
   said adjacent portions being movable to bias said adjacent portions towards coplanar relationship thereby decreasing the size of said opening for exerting a clamping action,
and said lug portion being movable to move said adjacent portions away from coplanar relationship thereby increasing the size of said opening.

7. A fastener as defined in claim 6, said one area having radial corrugations formed therein stretchable to accommodate overstressing of said loop during a clamping action.

References Cited by the Examiner
UNITED STATES PATENTS

| | | | |
|---|---|---|---|
| 282,466 | 7/83 | Preston | 24—27 |
| 1,173,998 | 2/16 | Depew. | |
| 1,631,396 | 6/27 | Beegle | 24—20 |
| 2,810,943 | 10/57 | Klancnik | 24—27 |
| 3,131,444 | 5/64 | Manning | 24—27 |

DONLEY J. STOCKING, *Primary Examiner.*